United States Patent [19]
Subramamian et al.

[11] Patent Number: 5,828,961
[45] Date of Patent: Oct. 27, 1998

[54] SYSTEM AND METHOD FOR PARTITIONING A CELLULAR ENVIRONMENT

[75] Inventors: Sairam Subramamian, Garland; Seshagiri Rao Madhavapeddy, Richardson, both of Tex.

[73] Assignee: Northern Telecom Limited, Montreal, Canada

[21] Appl. No.: 837,621

[22] Filed: Apr. 21, 1997

[51] Int. Cl.⁶ .................................................. H04Q 7/36
[52] U.S. Cl. .......................................... 455/446; 455/453
[58] Field of Search ................... 455/453, 446, 455/524, 560, 561, 422, 449

[56] References Cited

U.S. PATENT DOCUMENTS

| | | | |
|---|---|---|---|
| 3,617,714 | 11/1971 | Kernighan | 235/150 |
| 5,379,448 | 1/1995 | Ames et al. | 455/33.4 |
| 5,404,574 | 4/1995 | Benveniste | 455/33.1 |
| 5,442,804 | 8/1995 | Gunmar et al. | 455/33.1 |
| 5,442,807 | 8/1995 | Takayama | 455/33.1 |
| 5,454,026 | 9/1995 | Tanaka | 379/60 |
| 5,463,673 | 10/1995 | Herscovici | 379/59 |
| 5,475,868 | 12/1995 | Duque-Anton et al. | 455/62 |
| 5,507,007 | 4/1996 | Gunmar et al. | 455/33.1 |
| 5,561,841 | 10/1996 | Markus | 455/33.1 |
| 5,754,959 | 5/1998 | Ueno et al. | 455/453 |

OTHER PUBLICATIONS

Kernighan & Lin, *An Efficient Heuristic Procedure for Partitioning Graphs,* Sep. 30, 1969, pp. 291–307.

*Primary Examiner*—Nguyen Vo
*Assistant Examiner*—Duc Nguyen
*Attorney, Agent, or Firm*—Haynes and Boone, L.L.P.

[57] ABSTRACT

A method for evenly partitioning a cellular telephone system into a plurality of sets. The method partitions subsets of a cellular telephone system, such as cells, into a plurality of sets, such as mobile switching centers. The method first models each cell as a node having a node weight representing real time operating cost of the cell and a node edge weight representing call handoffs to and from the cell. The method similarly models each set having a set weight and set edge weight, which are similar to the node weight and node edge weight. Once modeled, the nodes are initially distributed into the sets so that each set has approximately the same set weight. Then a slack node is provided to each set. The slack node allows all the sets to have the exact same set weight and also accommodates for variability in set edge weights. Once the slack nodes are in place, several binary split operations are performed on the nodes. For each binary split operation, two nodes are temporarily swapped and a gain is determined. Eventually all the nodes will have been swapped and a maximum gain can thereby be deduced. A determination is made as to which nodes were swapped to achieve the maximum gain and those nodes are then permanently swapped.

8 Claims, 3 Drawing Sheets

SYSTEM AND METHOD FOR PARTITIONING A CELLULAR ENVIRONMENT

TECHNICAL FIELD

The invention relates generally to cellular telephone systems and, more particularly, to a system and method for partitioning a cellular telephone system into even subdivisions.

BACKGROUND

FIG. 1 illustrates a typical cellular telephone system ("system") 10. The system 10 serves a defined area by dividing the area into cells, such as cells C1–C9. Each cell C1–C9 is served by a single base station transceiver system ("BTS") BTS1–BTS9, respectively. A group of cells, is referred to as a region or location area ("LA"). LAs are grouped for localized services, such as paging or registration.

One or more BTSs are serviced by a base station controller ("BSC"), such as BSC1–BSC4. Likewise, one or more BSCs are serviced by a message switching center ("MSC"), such as MSC1 and MSC2. Finally, one or more MSCs are grouped to form the system 10. Mobile units, or users of the system 10, "subscribe" with a particular MSC and there fore, each MSC is responsible for establishing connection with its subscribers.

When a mobile unit is operating in one of the cells of the cellular telephone system, it makes an out-going call by first establishing a radio frequency ("RF") link with a BTS serving the cell. The BTS is connected to a BSC, which is connected to a MSC, which is connected to the public switched telephone network ("PSTN"), thereby connecting the mobile unit to the PSTN. As a result, the call may then be completed to its proper destination. When a mobile unit moves from a first cell to an adjacent second cell in the cellular telephone system, the BTS servicing the first cell must handoff the call to the BTS servicing the second cell. If both of the cells are serviced by the same BSC, such as cells C1 and C2, then BSC1 oversees and controls the handoff. If, however, the cells are serviced by different BSCs but the same MSC, such as cells C2 and C3, then MSC1 oversees and controls the handoff. Finally, if the cells are serviced by different MSCs, such as cells C4 and C5, then both MSC1 and MSC2 must be involved in performing the handoff.

When an in-coming call attempts to connect to a mobile unit, it first contacts the MSC to which the mobile unit subscribes, i.e., the mobile unit's "home MSC". The home MSC maintains one or more databases that allow it to decide which location area the mobile unit is most likely to reside. The BTSs of that location area are then instructed to send out paging signals to find the mobile unit. If the mobile unit responds, then a call is established, as described above for out-going calls. If the mobile unit does not respond, additional location areas, and potentially additional MSCs, must be contacted in order to locate the mobile unit and establish connection.

The above described activities are examples of work that must be performed by the different MSCs or BSCs of the cellular telephone system. Each of the MSCs or BSCs has a finite work-load capacity. Several factors that influence this capacity include the number of subscribers it has, the number of calls it services, the number of cells it services, the number of pages it performs, and the number of handoffs it controls. Once one MSC or BSC has reached its work-load capacity, calls do not get completed and may even be dropped, or disconnected.

Initially, cellular telephone systems were partitioned geographically. The total area serviced by the system was simply divided into equal subdivisions to be serviced by the MSCs and BSCs. However, as the popularity of cellular telephones has increased, the number of mobile units have been concentrated into certain areas. For example, a certain urban area may have ten times the number of mobile units as an equally sized rural area. Therefore, the cellular telephone system would become "full" whenever the MSC servicing the urban area neared its work-load capacity, even though the MSC servicing the rural area was not even near capacity.

Therefore, it is desirable to have each MSC and BSC to have an evenly distributed work-load. In so doing, a maximum number of mobile units can be serviced by a cellular telephone system.

SUMMARY

The present invention, accordingly, provides a method and system for evenly partitioning a cellular telephone system into a plurality of sets. For example, the method partitions the cells of a cellular telephone system into multiple sets to be serviced by an equal number of MSCs, LAs, or BSCs. The method first models each cell as a node having a node weight representing real time operating cost of the cell and a node edge weight representing call handoffs to and from the cell. The method similarly models each set having a set weight and set edge weight. The set weight equals the sum of all the node weights in the set and the set edge weight represents the node edge weights that start from nodes outside the set and end at nodes inside the set. The sum of the set weight and set edge weight is the work load for the set.

Once modeled, the nodes are initially distributed into the sets so that each set has approximately the same set weight. Then a slack node is provided to each set. The slack node allows all the sets to have the exact same set weight and also accommodates for variability in set edge weights. Once the slack nodes are in place, several binary split operations are performed on the nodes. For each binary split operation, two nodes are temporarily swapped and a gain is determined. Eventually all the nodes will have been swapped and a maximum gain can thereby be deduced. A determination is made as to which nodes were swapped to achieve the maximum gain and those nodes are then permanently swapped.

A technical advantage achieved with the invention is that the cells of the cellular telephone system can be evenly partitioned for each MSC, BSC or LA so that the work load for each is evenly distributed. As a result, the overall capacity of the cellular telephone system is significantly enhanced.

DETAILED DESCRIPTION

Figure 1:
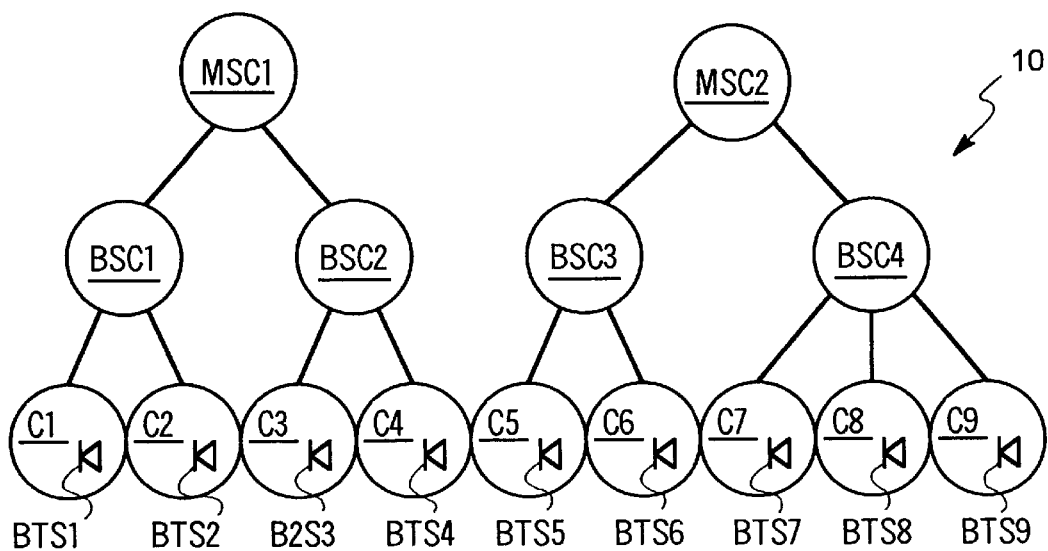
FIG. 1 illustrates a conventional cellular telephone system.

FIG. 1 illustrates a conventional cellular telephone system, as described in detail above.

To best utilize the MSCs of a system, such as the system 10 of FIG. 1, the cells of the system must be partitioned, or divided, in such a way as to divide their associated workload evenly between the MSCs. The same is also true for BSCs and LAs. For the sake of simplicity, only the partitioning of MSCs will be further discussed, it being understood that the system and method can be readily adapted to partition BSCs and LAs. The system and method can be divided into two parts: modeling the system and optimizing the system, discussed in greater detail below.

Modeling the System

Figure 2:
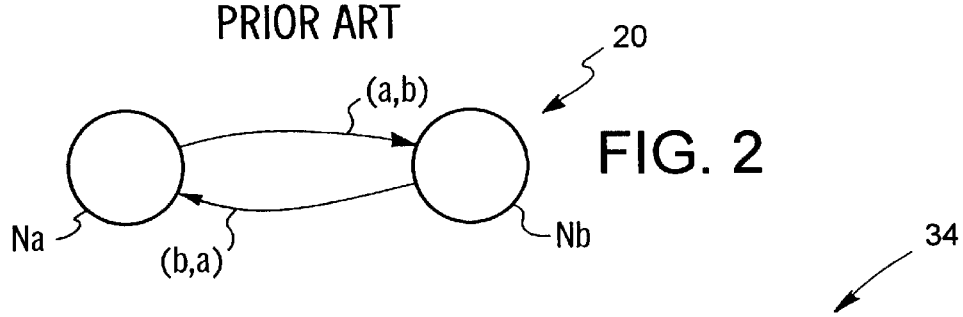
FIG. 2 illustrates a simple method for modeling two cells of a cellular telephone system.

A cellular telephone system can be modeled as a graph, with each cell represented as a "node" and each MSC referred to as a "set". Referring to FIG. 2, for the sake of simplicity, a system 20 is shown having two adjacent nodes: node Na and node Nb. There are also two "edges" between node Na and node Nb. A first edge (a,b) represents calls that start in node Na and are then handed-off to node Nb. Likewise, a second edge (b,a) represents calls that start in node Nb and are then handed-off to node Na. The first edge (a,b) is an "outgoing edge" to node Na and the second edge (b,a) is an "incoming edge" to node Na. Each of the nodes and edges are assigned a "weight", as defined below:

"node weight"—The weight of node Na is set to be the real-time cost due to various call-related activities in node Na. These call-related activities include the types of calls being used in node Na, hand-off related activities, and paging related activities. The weight of node Nb is similarly determined.

"edge weight"—The weight of the edge (a,b) considers two factors: the mobility of mobile units from node Na to node Nb when both nodes are in the same set, and the mobility of mobile units from node Na to node Nb when the nodes are in different sets. In many instances the edge weight (a,b) will equal the edge weight (b,a). However there are certain situations in which the mobility of mobile units from node Na to node Nb is different than that from node Nb to node Na. In these situations, the edge weight (a,b) would be different than the edge weight (b,a). The weight of the edge (b,a) is similarly determined.

Having defined the weights of the edges between nodes Na and Nb, a "cost" can be determined for each node, as defined below:

"internal cost"—The internal cost of node Na is the sum of all the weights of the edges that begin with node Na and end with a node that is in the same set as node Na. Since the system 20 only has two nodes, if node Nb is in the same set as node Na, the internal cost for node Na simply equals the edge weight for the edge (a,b). If node Nb is not in the same set as node Na, the internal cost for node Na equals zero. The internal cost of node Nb is similarly determined.

"external cost"—The external cost of node Na is the sum of all the weights of the edges that begin with node Na and end with a node that is not in the same set as node Na. Since the system 20 only has two nodes, if node Nb is in the same set as node Na, the external cost for node Na equals zero. If node Nb is not in the same set as node Na, the external cost for node Na simply equals the edge weight for the edge (a,b). The external cost of node Nb is similarly determined.

"cost difference"—The cost difference of a node is equal to the external cost minus the internal cost.

Although not shown, sets can be similarly graphed and modeled. An edge weight to a set is the sum of all incoming edges that start at a node outside of the set and end at a node inside the set. Also, a set's weight equals the sum of all the node weights of the nodes in the set.

Optimizing the System

Figure 3:
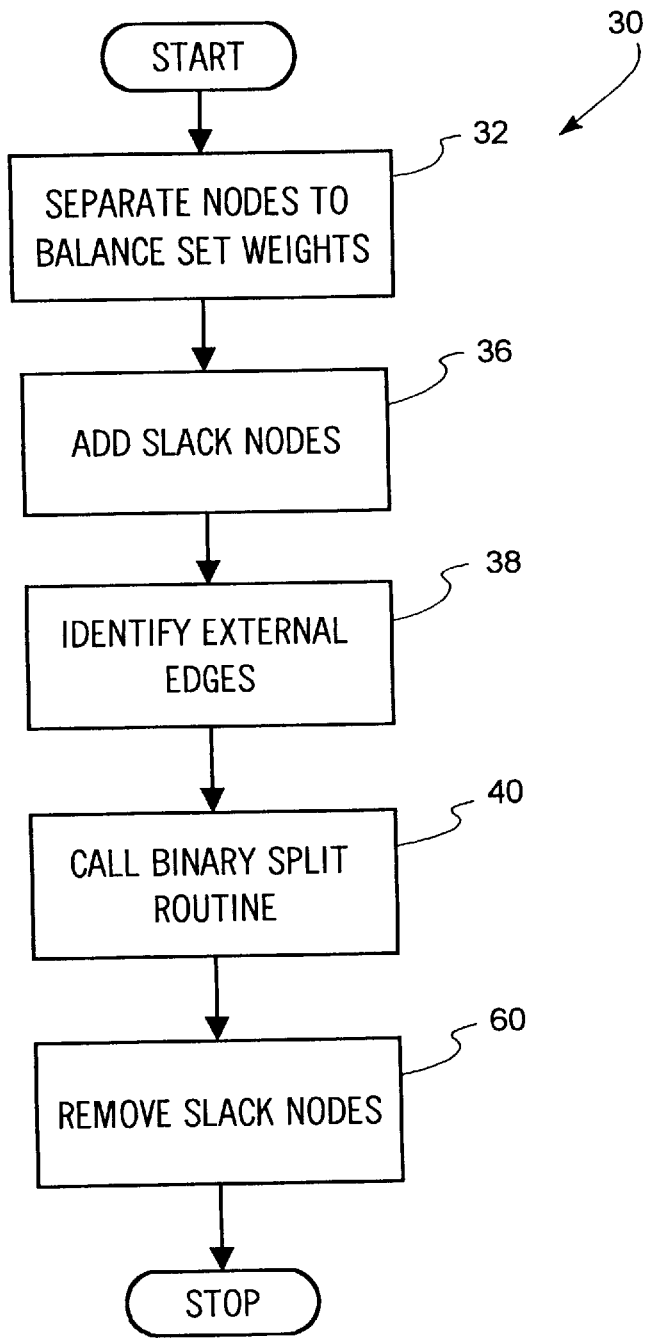
FIG. 3 is a flowchart of a method used for optimizing a cellular telephone system such as the one of FIG. 4.

Referring to FIG. 3, once all the nodes and edges of a system have been modeled, a method 30 optimizes the system into a predefined number of sets by finding a "balanced" partition of the nodes into the different sets. A balanced partition exists when each set has approximately the same "load", wherein a load L of a set S is defined:

$$L(S)=T(S)+I(S);$$

where T(S) represents the weight of set S and I(S) represents the edge weight of set S.

Execution begins at step 32 by separating all the nodes of a set to balance the set weights T(S). To balance the set weights, the nodes must be partitioned such that the set weight for each set is approximately the same. An ideal set weight for each set is defined:

$$T(\text{ideal})=[\text{sum of all the node weights}]/[\text{number of sets}]$$

Although it is not always possible to balance the set weights exactly, they can be balanced within a predefined acceptable threshold. Because this step of balancing does not consider edge weights, the sets weights can be easily balanced by moving nodes from one set to another or swapping nodes between different sets.

Figure 4:
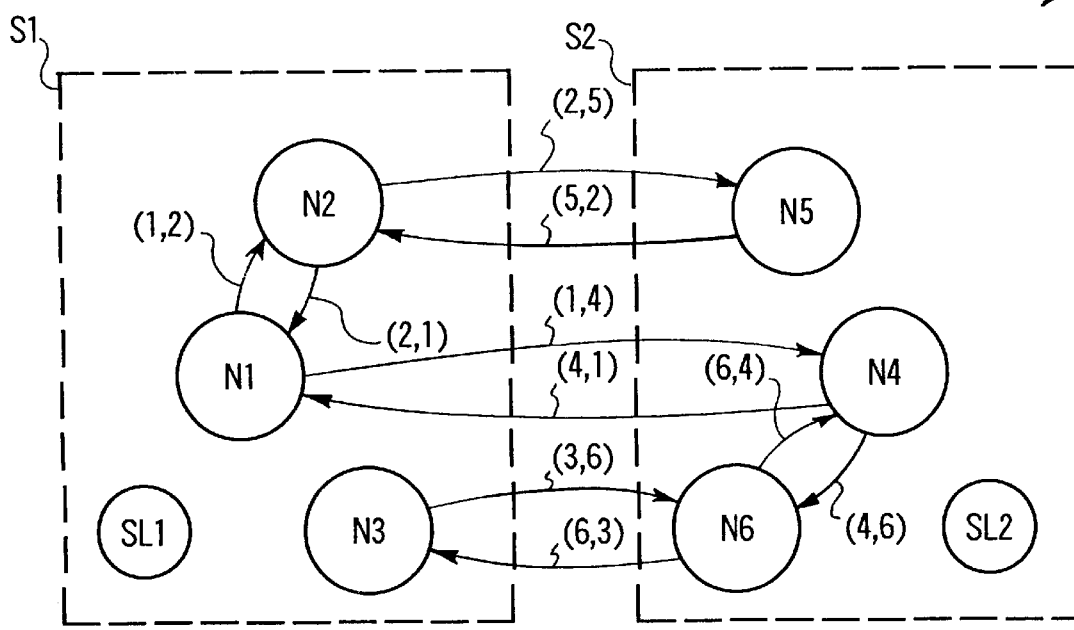
FIG. 4 illustrates a simple cellular telephone system that is modeled and ready to be optimized.

For the sake of example, FIG. 4, describes a system 34 including six nodes: N1, N2, N3, N4, N5, and N6, each node having a node weight nw1, nw2, nw3, nw4, nw5, and nw6, respectively. It is desired to partition the nodes N1–N6 into two sets with balanced set weights. Initially, the nodes N1, N2, and N3 are placed into a set S1 and nodes N4, N5, and N6 are placed into a set S2 such that their set weights T(S1) and T(S2) are approximately equal.

Once the set weights T(S) for each set have been defined, step 36 operates to balance the load weights L(S), which includes the set edge weights I(S). To initially account for the set edge weights I(S), as well as to account for the minor difference between the set weights T(S), a predetermined slack parameter "f" is defined to denote when an acceptably balanced partition has been achieved:

L(S1), L(S2)≦f * T(ideal);

L(S1)≦f * [nw1+nw2+nw3+nw4+nw5+nw6]/2; and

L(S2)≦f * [nw1+nw2+nw3+nw4+nw5+nw6]/2.

In order to model the slack parameter f, slack nodes SL1 and SL2 are intentionally placed in sets S1 and S2, respectively. Each slack node SL1 and SL2 has no edges, but has a node weight nwSL1 and nwSL2, respectively, defined as:

$$nwSL1 = f * T(\text{ideal}) - T(S1); \text{ and}$$

$$nwSL2 = f * T(\text{ideal}) - T(S2).$$

With the placement of each slack node, the set weights T(S) of each set are now exactly equal.

With the slack nodes in place, step 38 identifies the external edges of each set in order to reduce the edge weight I(S) for each. First of all, the external edges that connect between the sets must be identified. In the present example, node N1 is adjacent to nodes N2 and N4, node N2 is adjacent to nodes N5 and N1, node N3 is adjacent to node N6, node N4 is adjacent to nodes N1 and N6, node N5 is adjacent to node N2, and node N6 is adjacent to nodes N3 and N4. Therefore, the system 34 includes external edges (2,5), (5,2), (1,4), (4,1), (3,6), and (6,3), and internal edges (1,2), (2,1), (6,4), (4,6). As a result, the loads of sets S1 and S2 are respectively defined as follows:

$$L(S1)=[nw1+nw2+nw3]+[(5,2)+(4,1)+(6,3)]; \text{ and}$$

$$L(S2)=[nw5+nw4+nw6]+[(2,5)+(1,4)+(3,6)].$$

Figure 5:
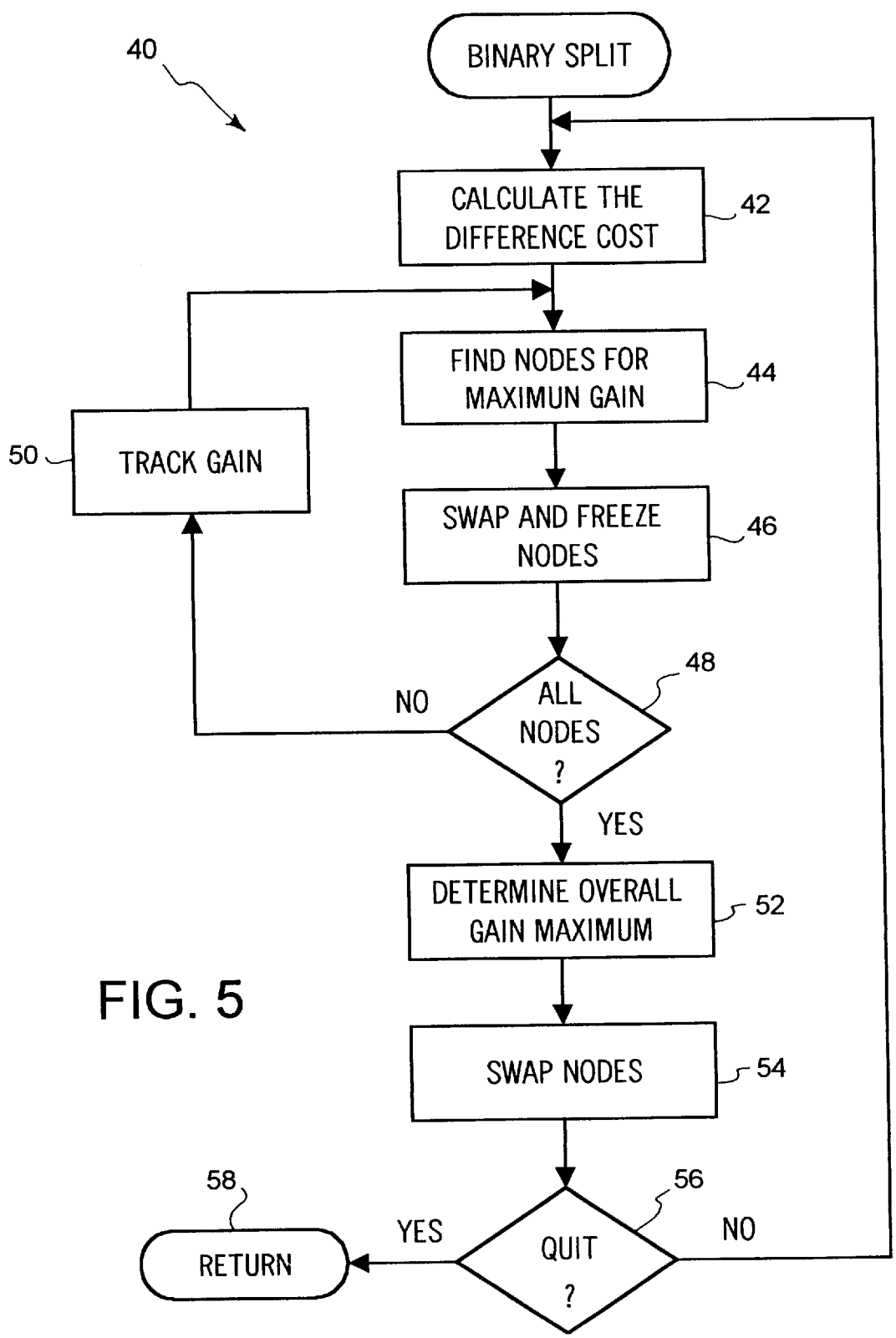
FIG. 5 is a flowchart of a binary split method used by the method of FIG. 3.

Once the external edges are identified, a binary split method 40 is used to determine which nodes to swap between the sets. Referring to FIG. 5, step 42, the difference cost for each node N1–N6, SL1, SL2 is determined. Listed below in Tables 1 and 2 are exemplary difference costs and edge weights for each node of the system 34.

TABLE 1

| Node | Dif. Cost | Node | Dif. Cost |
|------|-----------|------|-----------|
| N1   | −1        | N5   | −1        |
| N2   | 0         | N6   | 3         |
| N3   | −2        | SL1  | 0         |
| N4   | 1         | SL2  | 0         |

TABLE 2

| Edge | Weight | Edge | Weight |
|------|--------|------|--------|
| 1,1  | 0      | 4,1  | 4      |
| 1,2  | 2      | 4,4  | 0      |
| 1,4  | 2      | 4,6  | 1      |
| 2,1  | 1      | 5,2  | 1      |
| 2,2  | 0      | 5,5  | 0      |
| 2,5  | 2      | 6,3  | 4      |
| 3,3  | 0      | 6,4  | 2      |
| 3,6  | 2      | 6,6  | 0      |

Certain of the above edges are recursive, i.e., they are pointed to themselves. This is because, in the steps described below, it is possible to swap just a fraction of one of the nodes. For example, node N5 may be swapped with 50% of node N2. In this case, the recursive edge weight (2,2) would no longer be 0, but would be set to an extremely high number, such as 999. (Note, however, that slack nodes SL1 and SL2 have no edge weight, even when split.) As a result of this edge weight being so high, when the method 40 is complete, all the nodes will be whole, or 100%. However, allowing intermediate steps to split a node facilitates the operation of the method 40, as will become evident in the following description.

At step 44, a determination is made as to which two nodes if swapped, would provide a maximum gain. A gain G1 is defined:

$$G1=[I(S1)+I(S2)]-[I(S1')+I(S2')]$$

where I(S1) and I(S2) represent the original set edge weights of sets S1 and S2, respectively, originally, before any swapping has occurred. In the example of FIG. 3, along with the values in Tables 1 and 2:

$$[I(S1)+I(S2)]=9+6=15.$$

Furthermore, I(S1') and I(S2') represent the edge weights of sets S1 and S2, respectively, after the last swap. Only nodes of equal weight are swapped, thereby maintaining the equal set weights T(S1) and T(S2). However, since the two nodes being swapped may actually have different node weights, it may be necessary to split either node to obtain the equal node weight.

At step 46, the two nodes are temporarily swapped and frozen. Because they are frozen, they can not be swapped back until they are later unfrozen. In this way, the method 40 will not continually swap the same two nodes back and forth.

At step 48, a determination is made as to whether there are still nodes available to be swapped. Because the two sets S1 and S2 have equal weights and the requirement that the swapped nodes carry the same load weight, eventually all the nodes of both sets will be swapped.

If at step 48 it was determined that all the nodes have not yet been swapped, execution proceeds to step 50. At step 50, a record is kept of the cumulative gain to that point, as well as all the nodes that have been swapped to reach that cumulative gain. An example of the record, as applied to FIG. 3, is illustrated below in Table 3. Execution then returns to step 44.

TABLE 3

| Gain    | 15 − 6 = 9 | 15 − 3 = 12 | 15 − 999 = −1014 | 15 − 12 = 3 | 15 − 15 = 0 |
|---------|------------|-------------|------------------|-------------|-------------|
| S1 node | Node N3    | Node N1     | Node N2          | 60% Node SL1 | 40% Node SL1 |
| S2 node | Node N5    | Node SL2    | 50% Node 6       | 50% Node N6 | Node N4     |

If at step 48 it was determined that all the nodes have been swapped, execution proceeds to step 52. At step 52, the record of cumulative gains is examined to find when a maximum gain was achieved. In the example of Table 3, the maximum gain of 12 occurred after node N3 and node N5 were swapped.

At step 54, all the nodes are unfrozen and returned to their previous location, and an actual swap is performed only on the nodes necessary to achieve the maximum gain. If the gain never exceeds zero after the first swap, then the maximum gain is zero and no further action is performed. In the example of Table 3, all the nodes would be returned to their original set, and then nodes N3 and N5 would be swapped and nodes N1 and SL2 would be swapped.

At step 56, a determination is made as to whether the method 40 should terminate. A positive threshold value is defined such that, if the maximum gain determined above does not exceed the positive threshold value, then execution will proceed to step 58 and returns to the method 30. If however, the maximum gain exceeds the threshold value, execution returns to step 42.

Referring again to FIG. 3, once the binary split routine 40 has completed, step 60 removes all the slack nodes from the sets. As a result, the load L(S) for each set is now optimized.

Although illustrative embodiments of the invention have been shown and described, other modifications, changes, and substitutions are intended in the foregoing disclosure. For example, additional factors may attribute to either the node weight or edge weight so that the system can be modeled with respect to these additional factors. Furthermore, the above discussion of two sets can be readily adapted for three or more sets. Accordingly, it is appropriate that the appended claims be construed broadly and in a manner consistent with the scope of the invention.

What is claimed is:

1. A method for partitioning a cellular telephone system into a plurality of sets, each set having a set weight and an edge weight, so that the sum of the set weight and edge weight for each set is balanced, the method comprising the steps of:
   a) modeling subsets of the cellular telephone system as nodes, each node including a node weight and an edge weight;
   b) distributing the nodes into the sets so that each set has approximately the same set weight;
   c) providing a slack node for at least one of the sets so that, with the addition of the slack node to the at least one of the sets, all the sets have exactly the same set weight;
   d) performing a plurality of binary split operations of the nodes between the plurality of sets, for each binary split tracking a gain in response to that binary split;
   e) determining a maximum gain from the gains tracked for each binary split operation; and
   f) swapping the nodes in accordance with the binary split operations that were performed to achieve the maximum gain.

2. A method according to claim 1 further comprising the step of:
   if the maximum gain is greater than a predetermined threshold amount, repeating steps d), e), and f).

3. A method according to claim 1 wherein the binary split operation comprises the steps of:
   g) calculating a difference cost for each node;
   h) selecting two nodes to swap between two of the plurality of sets;
   i) temporarily swapping and freezing the selected two nodes;
   j) determining and tracking the gain after the selected two nodes have been swapped;
   k) if all the nodes have not been frozen, repeating steps g), h), i), and j); and
   l) unfreezing all the nodes.

4. A method according to claim 3 wherein portions of each node can be swapped.

5. A method according to claim 1 wherein the subsets represent base station transceivers and the sets represent mobile switching centers of the cellular telephone system.

6. A method according to claim 1 wherein the subsets represent base station transceivers and the sets represent base station controllers of the cellular telephone system.

7. A method according to claim 1 wherein the subsets represent base station transceivers and the sets represent location areas of the cellular telephone system.

8. A method according to claim 1 wherein the subsets represent base station controllers and the sets represent mobile switching centers of the cellular telephone system.

* * * * *